3,049,183
PEG HARROW-WELDED TOOTH BAR

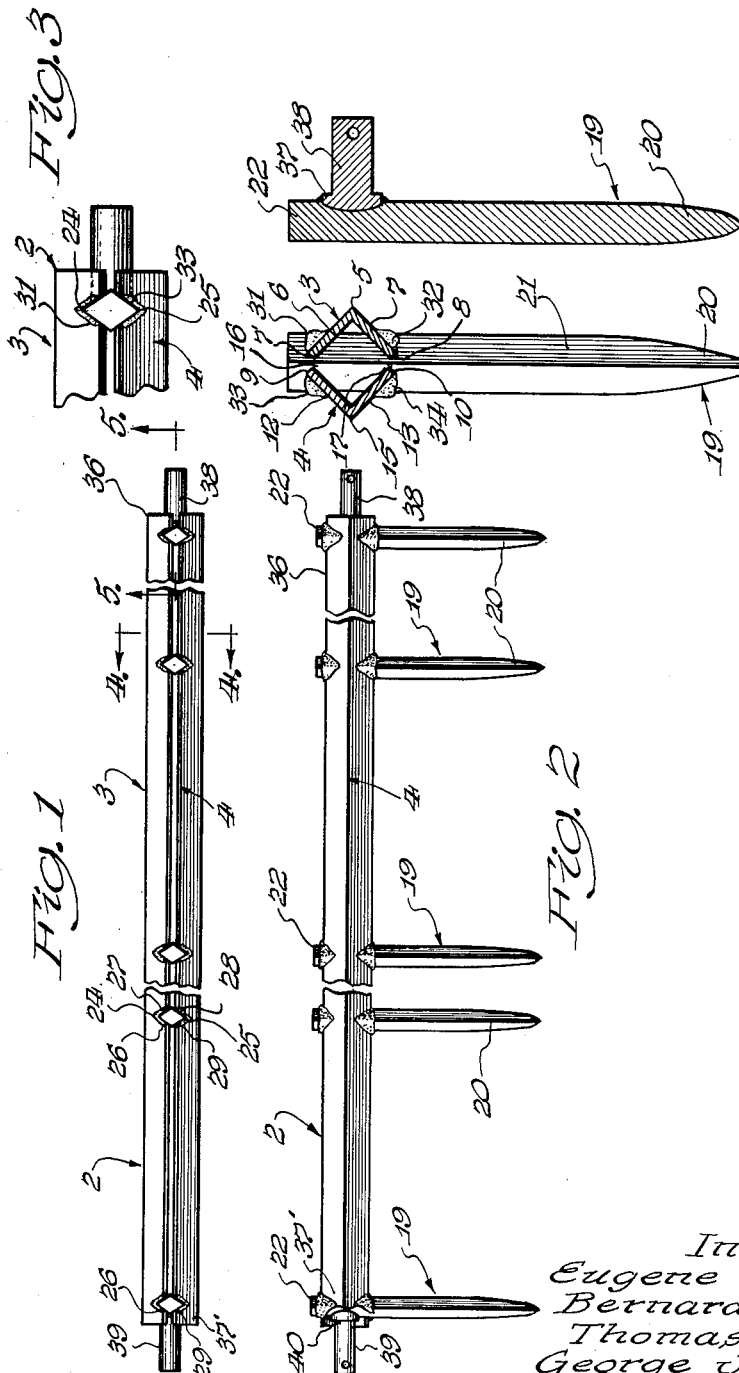

Eugene J. Birkenbach, Des Plaines, Bernard E. Brown, Chicago, Thomas Vendl, Lombard, and George J. Pfeiffer, Sr., Berwyn, Ill., assignors to International Harvester Company, Chicago, Ill., a corporation of New Jersey
Filed Mar. 18, 1957, Ser. No. 646,655
1 Claim. (Cl. 172—691)

This invention relates to harrows and more specifically to peg tooth harrows.

Various attempts have been made to adequately secure the teeth of a peg tooth harrow to the supporting tooth bar including threading, riveting and weldments. Currently there is being marketed a peg tooth harrow wherein the teeth are projection welded to the top and bottom horizontal flanges of a U-shaped or channel-shaped bar in an attempt to provide an inexpensive construction. However, this construction suffers from two extremely serious drawbacks which have shown up repeatedly in actual operation, namely, that the tooth bar or the channel beam is arranged so that it presents its weakest section to oppose the thrust and, secondly, the projection welding of the teeth to the top and bottom flanges frequently develops incipient cracks which result in early failures in the connection.

The general object of the invention is to provide a novel tooth bar and connection with the teeth such that the tooth bar is equally strong vertically as well as horizontally to adequately resist the vertical as well as the horizontal loads imposed thereon during operation of the harrow.

A further object of the invention is to provide a novel tooth bar construction which effects a saving of material and wherein common structural sections are utilized and arranged in effective relationship to provide a rugged and durable structure.

A further object of the invention is to provide a novel assembly of a tooth bar which incorporates a pair of angle beams which are arranged in opposing relationship and which clamp the associated teeth therebetween and are projection welded thereto to opposite sides of the teeth.

A different object of the invention is to provide a novel and efficient method for projection welding of the teeth and the tooth bars which reduces costs and obtains a greatly improved product.

These and other objects of the invention become more apparent from the specification and the drawings wherein:

FIGURE 1 is a broken apart plan view of the novel tooth bar;

FIGURE 2 is a side elevational view of the tooth bar shown in FIGURE 1;

FIGURE 3 is an enlarged plan view of an end portion of the tooth bar;

FIGURE 4 is a transverse vertical sectional view taken substantially on the line 4—4 of FIGURE 1; and FIGURE 5 is a sectional view of an end tooth and mounting for the tooth bar taken substantially on the line 5—5 of FIGURE 1.

Describing the invention in detail and having particular reference to the drawings, there is shown a tooth bar generally designated 2 which comprises a pair of forward and rearward or front and rear angle beams 3 and 4. These angle beams 3 and 4 are disposed horizontally in opposing relation, that is, the front angle beam 3 has its apex 5 directed forwardly and its top and bottom flanges or portions 6 and 7 diverging rearwardly from the apex 5 with the free edges 7' and 8 opposing and contiguous to the free edges 9 and 10 of the top and bottom flanges 12 and 13 of the rear beam 4 which is also arranged horizontally and transversely to the direction of operation of the peg tooth harrow, as well understood by those skilled in the art. The top and bottom flanges 12 and 13 of the rear beam converge into a rearwardly directed apex 15. It will be seen that the beams 3 and 4 are arranged to provide a diamond shape in side elevation and thus in effect develop top and bottom apices 16 and 17 and the arrangement thus provides an extremely rigid structure fore and aft which resists load deflection and also develops a vertical strength to resist upward deflection through interconnection with the teeth as hereinafter described.

Interposed between the front and rear beams are a plurality of peg teeth generally indicated 19, said teeth having a sharpened or tapering lower or penetrating point 20 and being diamond-shaped in cross section as best seen in FIGURES 1 and 3. Thus each tooth shank 21 has an upper portion 22 arranged so that it presents a sharp apex 24 directed forwardly and a sharp apex or corner 25 directed rearwardly and at opposite sides of the corner 24 are presented rearwardly diverging sides 26 and 27 and at opposite ends of the apex 25 are presented rearwardly converging sides 28 and 29 which in turn define apices directed lengthwise of the bar. The teeth are projection welded to the top and bottom flanges 6 and 7 of the front beam 3 and as will be readily seen in view of the acute angularity between the flanges of the beams and the shank which is positioned vertically and the construction of the tooth, as best seen in FIGURE 4, that during projection welding the tooth imbeds itself into the top and bottom flanges and at the same time the material or portions 31 and 32 flow lengthwise or outwardly from the flanges 6 and 7 along the sides 26 and 27 of the related tooth and wrap around these sides to provide a broad area of weldment therebetween. Similarly, as the teeth 19 are projection welded to the top and bottom flanges 12 and 13 the portions 33 and 34 thereof flow outwardly and around the sides 28 and 29 of the related tooth as the tooth is being imbedded in the beam 4 during the projection welding operation. Thus broad areas of weldment are developed and an effective juncture is obtained.

It will be seen that each end tooth 19 is projection welded on its sides 27 and 28, on the right-hand end 36 of the beam, to the head 37 of a generally horizontal pintle or pin 38 which extends outwardly of the related end of the beam in peripheral spaced relation to the flanges of the front and rear beams. Similarly, the left end 37' of the support structure 2 is connected to the pintle or pin 39 at its head 40 by projection welding to the sides 26 and 29 of the related end tooth 19.

In fabricating the novel beam either of two methods may be used. In each method the pintles 38 and 39 are attached to the respective end teeth 19. It will be observed that the two end teeth are of identical construction except that they are turned around 180°. The teeth are then each laid across the front beam with their upper shank portions 22 in bridging relation to the flanges 6 and 7 and either individually or simultaneously pressed into the flanges while the welding current is applied so that the material portions 31 and 32 of the flanges of the beams 3 soften and flow outwardly and wrap around the respective sides of the teeth. It has been found that inasmuch as the material does not melt entirely that the actual resistance to deformation of the flange material causes it to wrap around the sides in view of the contour of the teeth and the fact that the flanges are arranged at acute angles is conducive to produce this effect. After this series of teeth are welded to the tooth bar 3 then the beam 4 is laid across the back sides of the teeth and each is individually projection welded by pressing the beam with the tooth toward the rear beam or pressing the rear beam in the individual spots toward the respective teeth.

Preferably the operation is initiated at the center and progressed outwardly in order to control and take into account warpage of the beams. As an alternative all of the teeth may be placed between the front and rear beams as shown in assembled relation and then all the teeth may be simultaneously projection welded by clamping the entire assembly together or each of the individual teeth may be individually welded by progressing either from one end of the beam to the other or from the center of the beam toward each end. This latter of method is actually preferable inasmuch as the teeth in the regions of the welds are heated with opposite sides simultaneously and thus creep, warpage, etc. are minimized and more readily controlled in the one operation.

Thus it will be observed that a structure is afforded wherein the teeth and the beams are interconnected in mutual strength developing relationship and the teeth are clamped between the angle beams and the angle beams are arranged to develop their greatest strength in a simple, efficient and rugged structure.

It will be understood that the foregoing embodiment has been chosen for illustration and description and is not in any way intended to limit the scope of the invention which is covered in the appended claim.

What is claimed is:

In a peg tooth harrow, a generally horizontal transverse tooth-supporting bar comprising a pair of opposed generally horizontal angle beams disposed side by side in a diamond-shape arrangement providing top, bottom, front and rear apices, each beam having top and bottom flanges diverging toward the other beam, upright peg teeth between said beams and having portions extending above and below the same, said flanges and teeth disposed at acute angles to each other, and a projection weld connection between the top and bottom flanges of each beam and the adjacent sides of the teeth and said flanges having portions embracing said teeth and having a wide area of weldment therewith, said connections of the top flanges and bottom flanges being respectively aligned transversely of the related tooth and extending above and below the bar, and pintle means projection welded to the teeth at the ends of the bar and projecting outwardly of said bar through the space defined between said beams, said pintle means disposed in the region of connection of the tooth with the angle beams.

References Cited in the file of this patent

UNITED STATES PATENTS

| | | |
|---|---|---|
| 399,614 | Hendricks | Mar. 12, 1889 |
| 604,223 | Babcock | May 17, 1898 |
| 1,085,089 | Lachman | Jan. 20, 1914 |
| 1,101,858 | Lachman | June 30, 1914 |
| 2,208,835 | Donovan | July 23, 1940 |
| 2,258,433 | Zink | Oct. 7, 1941 |